(12) United States Patent
Sakata

(10) Patent No.: US 12,725,387 B2
(45) Date of Patent: Sep. 1, 2026

(54) OBJECT DETECTION DEVICE HAVING FIRST AND SECOND DETECTORS FOR DETECTING AN OBJECT, OBJECT DETECTION METHOD, AND PROGRAM

(71) Applicant: OMRON Corporation, Kyoto (JP)

(72) Inventor: Shinya Sakata, Kyoto (JP)

(73) Assignee: OMRON Corporation, Kyoto (JP)

( * ) Notice: Subject to any disclaimer, the term of this patent is extended or adjusted under 35 U.S.C. 154(b) by 384 days.

(21) Appl. No.: 18/547,793

(22) PCT Filed: Dec. 20, 2021

(86) PCT No.: PCT/JP2021/047100

§ 371 (c)(1),
(2) Date: Aug. 24, 2023

(87) PCT Pub. No.: WO2022/190531

PCT Pub. Date: Sep. 15, 2022

(65) Prior Publication Data

US 2024/0144631 A1 May 2, 2024

(30) Foreign Application Priority Data

Mar. 8, 2021 (JP) ................................ 2021-036637

(51) Int. Cl.
*G06V 10/22* (2022.01)
*G06V 10/74* (2022.01)

(52) U.S. Cl.
CPC ............ *G06V 10/22* (2022.01); *G06V 10/761* (2022.01)

(58) Field of Classification Search
CPC ..... G06V 10/22; G06V 10/761; G06V 40/167
See application file for complete search history.

(56) References Cited

U.S. PATENT DOCUMENTS

2018/0032794 A1* 2/2018 Ji ......................... G06V 40/161
2018/0240251 A1 8/2018 Kitagawa
(Continued)

FOREIGN PATENT DOCUMENTS

CN 108353128 A 7/2018
CN 110532838 A 12/2019
(Continued)

OTHER PUBLICATIONS

First Office Action issued in Chinese Appln. No. 202180093783.0 mailed Apr. 3, 2025.
(Continued)

*Primary Examiner* — Matthew C Bella
*Assistant Examiner* — Jinsu Hwang
(74) *Attorney, Agent, or Firm* — ROSSI, KIMMS & McDOWELL LLP

(57) ABSTRACT

An object detection device for detecting a predetermined object from an image includes a first detector that detects one or more candidate areas including the predetermined object from the image, a determiner that determines a target area from the one or more candidate areas detected by the first detector, a second detector that detects the predetermined object in the target area with a detection algorithm different from a detection algorithm used by the first detector, and a storage that stores detection information indicating a detection result obtained by the second detector for the target area. The determiner determines the target area from the one or more candidate areas based on the detection information about a frame being at least one frame preceding a current frame.

9 Claims, 5 Drawing Sheets

(56) References Cited

U.S. PATENT DOCUMENTS

| | | | |
|---|---|---|---|
| 2020/0394797 | A1 | 12/2020 | Sakai et al. |
| 2021/0357708 | A1 | 11/2021 | Sakai |

FOREIGN PATENT DOCUMENTS

| | | | | | |
|---|---|---|---|---|---|
| JP | 2006293720 | A | | 10/2006 | |
| JP | 2019021001 | A | | 2/2019 | |
| JP | 2019159391 | A | * | 9/2019 | ........... G06V 40/167 |
| JP | 2019169391 | A | * | 10/2019 | |

OTHER PUBLICATIONS

International Search Report issued in Intl. Appln. No. PCT/JP2021/047100 mailed Mar. 1, 2022. English translation provided.

Written Opinion issued in Intl. Appln. No. PCT/JP2021/047100 mailed Mar. 1, 2022. English translation provided.

* cited by examiner

Start
Obtain input image
S31
Detect candidate areas
(first detection)
S32
Determination
S33
Detect object
(second detection)
S34
Erroneous
detection?
S35
Yes
No
Record detection
information into storage
S36
Output result
S37
End

OBJECT DETECTION DEVICE HAVING FIRST AND SECOND DETECTORS FOR DETECTING AN OBJECT, OBJECT DETECTION METHOD, AND PROGRAM

FIELD

The present invention relates to a technique for detecting an object.

BACKGROUND

Known object detection techniques may use two detectors that are a preceding detector and a subsequent detector. For example, object detection described in Patent Literatures 1 and 2 is performed with high accuracy using a preceding detector that detects candidate areas for detection targets (e.g., the face) and a subsequent detector that detects the detection targets from the multiple candidate areas.

CITATION LIST

Patent Literature

Patent Literature 1: Japanese Unexamined Patent Application Publication No. 2006-293720

Patent Literature 2: Japanese Unexamined Patent Application Publication No. 2019-021001

SUMMARY

Technical Problem

However, such known techniques perform two separate detection processes, or a two-stage detection process, that use more processing time. In particular, when a stationary camera is used, objects except detection target objects (e.g., moving objects) appear in the same manner. Thus, erroneous detection once performed by the preceding detector is repeated at the same location. More specifically, the subsequent detector performs a detection process for the area for which erroneous detection has been performed, thus further increasing the processing time.

One or more aspects of the present invention are directed to a technique for object detection at high speed and with high accuracy.

Solution to Problem

The technique according to one or more aspects of the present invention provides the structure below.

An object detection device according to a first aspect of the present invention detects a predetermined object from an image. The device includes a first detector that detects one or more candidate areas including the predetermined object from the image, a determiner that determines a target area from the one or more candidate areas detected by the first detector, a second detector that detects the predetermined object in the target area with a detection algorithm different from a detection algorithm used by the first detector, and a storage that stores detection information indicating a detection result obtained by the second detector for the target area. The determiner determines the target area from the one or more candidate areas based on the detection information about a frame being at least one frame preceding a current frame.

Any objects may be detection targets, including a human body, a face, a specific animal, an automobile, and a specific product. A candidate area is determined with the first detector to be likely to include a detection target object. This candidate area is used to determine an area (target area) for which detection is performed with the second detector. Although the first detector and the second detector may use any algorithm, the detection algorithm used by the second detector may allow more accurate detection with a larger amount of computation than the detection algorithm used by the first detector. The object detection with the second detector generates detection information including, for example, the position and the size of a target area, an image corresponding to the target area, and a score indicating the likelihood of the detection target object included in the target area.

The detection information may include information about a target area in which the predetermined object is undetected by the second detector. In this structure, the determiner may exclude a candidate area of the one or more candidate areas with a similarity greater than or equal to a predetermined value to a target area in which the predetermined object is undetected in a previous frame, and determine one or more other candidate areas of the one or more candidate areas as the target area. The first detector may output a first detection confidence level indicating a likelihood of the predetermined object included in the one or more candidate areas. The determiner may determine the target area from one or more candidate areas of the one or more candidate areas with a similarity greater than or equal to a predetermined value to a target area in which the predetermined object is undetected in a previous frame based on a value obtained by subtracting a predetermined value from the first detection confidence level. The determiner may determine the target area from one or more other candidate areas of the one or more candidate areas based on the first detection confidence level. This structure reduces the number of candidate areas to be used by the second detector. The two-stage detection process may thus be performed to reduce the processing time without lowering the detection accuracy.

The predetermined value to be subtracted from the first detection confidence level may be determined based on a number of consecutive frames in which the predetermined object is undetected by the second detector. For example, the predetermined value may be greater as the number of consecutive frames increases, or the predetermined value may be subtracted from the first detection confidence level for the first time when the number of consecutive frames reaches a predetermined value. The predetermined value to be subtracted from the first detection confidence level may be fixed.

The first detector may output a first detection confidence level indicating a likelihood of the predetermined object included in the one or more candidate areas. The detection information may include a second detection confidence level determined by the second detector and indicating a likelihood of the predetermined object included in the one or more candidate areas. The determiner may determine the target area from one or more candidate areas of the one or more candidate areas with a similarity greater than or equal to a predetermined value to a target area indicated by the detection information based on a value obtained by subtracting a value corresponding to the second detection confidence level from the first detection confidence level. The determiner may determine the target area from one or more other candidate areas of the one or more candidate areas based on the first detection confidence level. For example, the predetermined value to be subtracted from the first detection confidence level may be greater as the second detection confidence level increases.

The detection information may include at least one of a position or a size of the target area. The determiner may calculate the similarity based on at least one of a position or a size of each of the one or more candidate areas and the at least one of the position or the size of the target area. An object in an input image may be erroneously detected repeatedly. However, this structure may effectively reduce erroneous repeated detection of an object at the same position and with the same size. This reduces the number of candidate areas to be used by the second detector. The two-stage detection process may thus be performed to reduce the processing time without lowering the detection accuracy.

The detection information may include an image corresponding to the target area. The determiner may calculate the similarity based on the image included in the detection information and images corresponding to the one or more candidate areas. For an area corresponding to erroneous detection information and a candidate area identical or similar to each other in the position and size, this structure can perform object detection with high accuracy when images corresponding to the two areas largely differ from each other.

An object detection method according to a second aspect of the present invention is a method for detecting a predetermined object from an image. The method includes detecting one or more candidate areas including the predetermined object from the image, determining a target area from the detected one or more candidate areas, detecting the predetermined object in the target area with a detection algorithm different from an algorithm used in detecting the one or more candidate areas, and storing detection information indicating a detection result in detecting the predetermined object in the target area. Determining the target area includes determining the target area from the one or more candidate areas based on the detection information about a frame being at least one frame preceding a current frame.

One or more aspects of the present invention may be directed to an object detection device including at least one of the above elements, or to an apparatus for identifying or tracking a detection target object, an image processing apparatus, or a monitoring system. One or more aspects of the present invention may be directed to an object detection method including at least one of the above processes, or to an object identifying method, an object tracking method, an image processing method, or a monitoring method. One or more aspects of the present invention may also be directed to a program for implementing any of these methods or as a non-transitory storage medium storing the program. The above elements and processes may be combined with one another in any possible manner to form one or more aspects of the present invention.

Advantageous Effects

The structure according to the above aspects of the present invention allows object detection at high speed and with high accuracy.

DETAILED DESCRIPTION

(Example Use)

Figure 1:
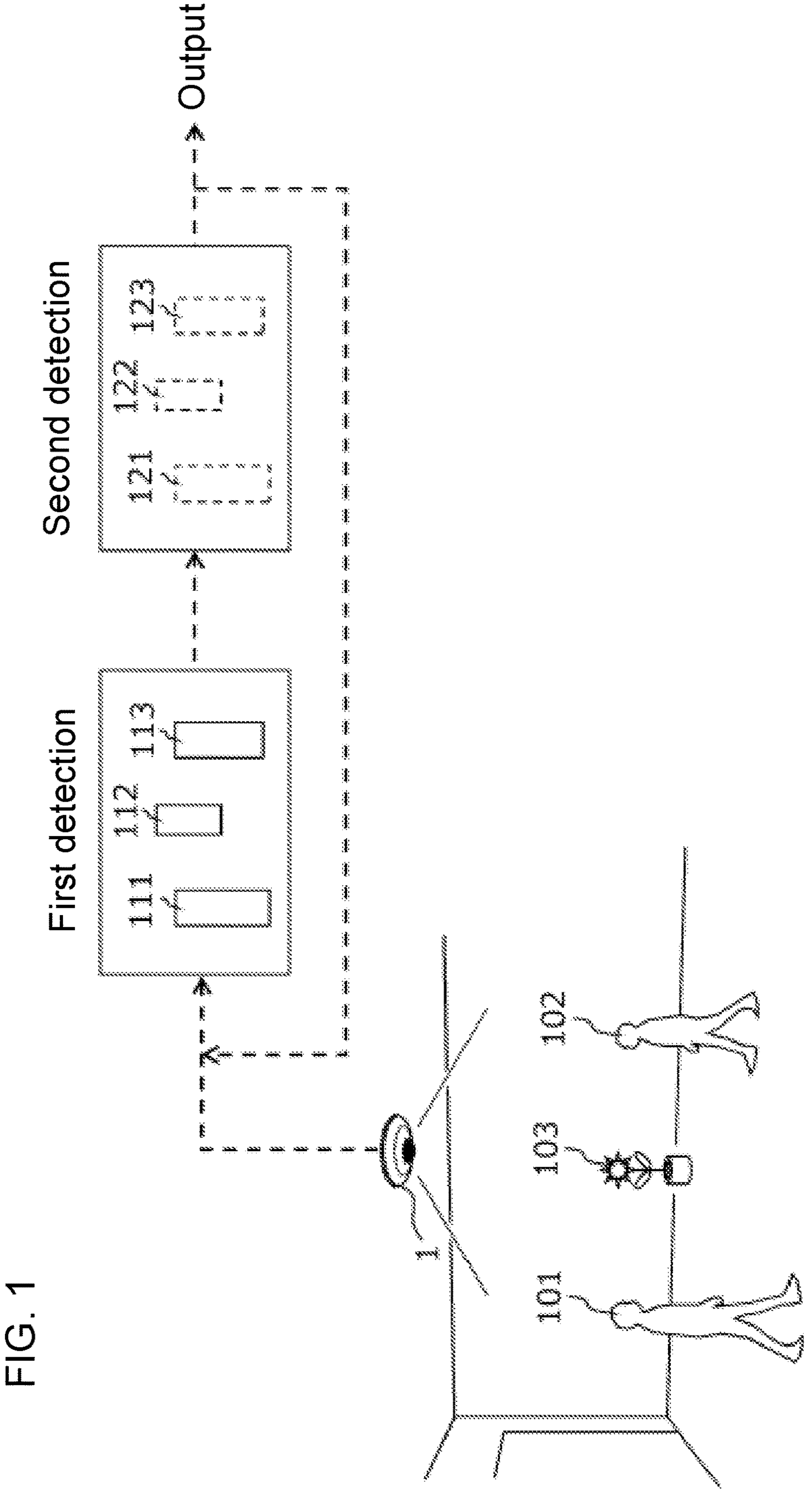
FIG. 1 is a diagram showing an example use of object detection.

With reference to FIG. 1, an example use of an object detection device according to one or more embodiments of the present invention will be described. The object detection device detects a target object (e.g., a human) from an image obtained with a stationary camera fixed above a detection target area (e.g., a ceiling). The object detection device includes two separate detectors that are a preceding detector and a subsequent detector. An object 101 and an object 102 are detection targets (e.g., humans) that can move in an imaging area of a stationary camera 1. An object 103 (e.g., a flower) is located in the imaging area of the stationary camera 1. The preceding detector in the object detection device detects candidate areas 111 to 113 including detection targets from an input image. The candidate areas 111 to 113 correspond to the objects 101 to 103. The object 103 is not a human to be detected. However, when the object 103 has features similar to a human, the candidate area 113 is generated. The subsequent detector in the object detection device then performs object detection and records a detection result into a storage. The subsequent detector basically performs object detection on target areas 121 to 123 corresponding to the candidate areas 111 to 113. When the preceding detector erroneously detects the object 103 (flower) as a target object, the subsequent detector can determine that the object 103 is not a target object. In this case, the preceding detector possibly continues to erroneously detect the object 103. When all the candidate areas are used as target areas in the situation shown in FIG. 1, the subsequent detector performs a wasteful process of detection in every frame for a candidate area including no target object.

In the example use, an area (target area) for which the subsequent detector performs object detection is determined from areas (candidate areas) in which the preceding detector has detected an object based on detection information about a frame that is at least one frame preceding the current frame. When, for example, a candidate area in the current frame is highly similar to an area in which the subsequent detector has detected no object in a frame that is at least one frame preceding the current frame, the candidate area may be excluded from target areas. Target areas may also be determined from candidate areas based on a detection score (confidence level) of the preceding detector. More specifically, when the subsequent detector has detected no target object in an area in a frame that is at least one frame preceding the current frame, a predetermined value is subtracted from the detection score for the area. The area may then be determined as a target area based on the resultant score. The value to be subtracted may be fixed or adjusted based on the number of consecutive frames in which no target object has been detected. As described above, an area in which the preceding detector has detected a target object is selectively excluded from processing targets of the subsequent detector when the area is similar to an area in which the subsequent detector has detected no target object. This may reduce the time taken by the processing without lowering the accuracy of object detection.

First Embodiment

<Structure>

Figure 2:
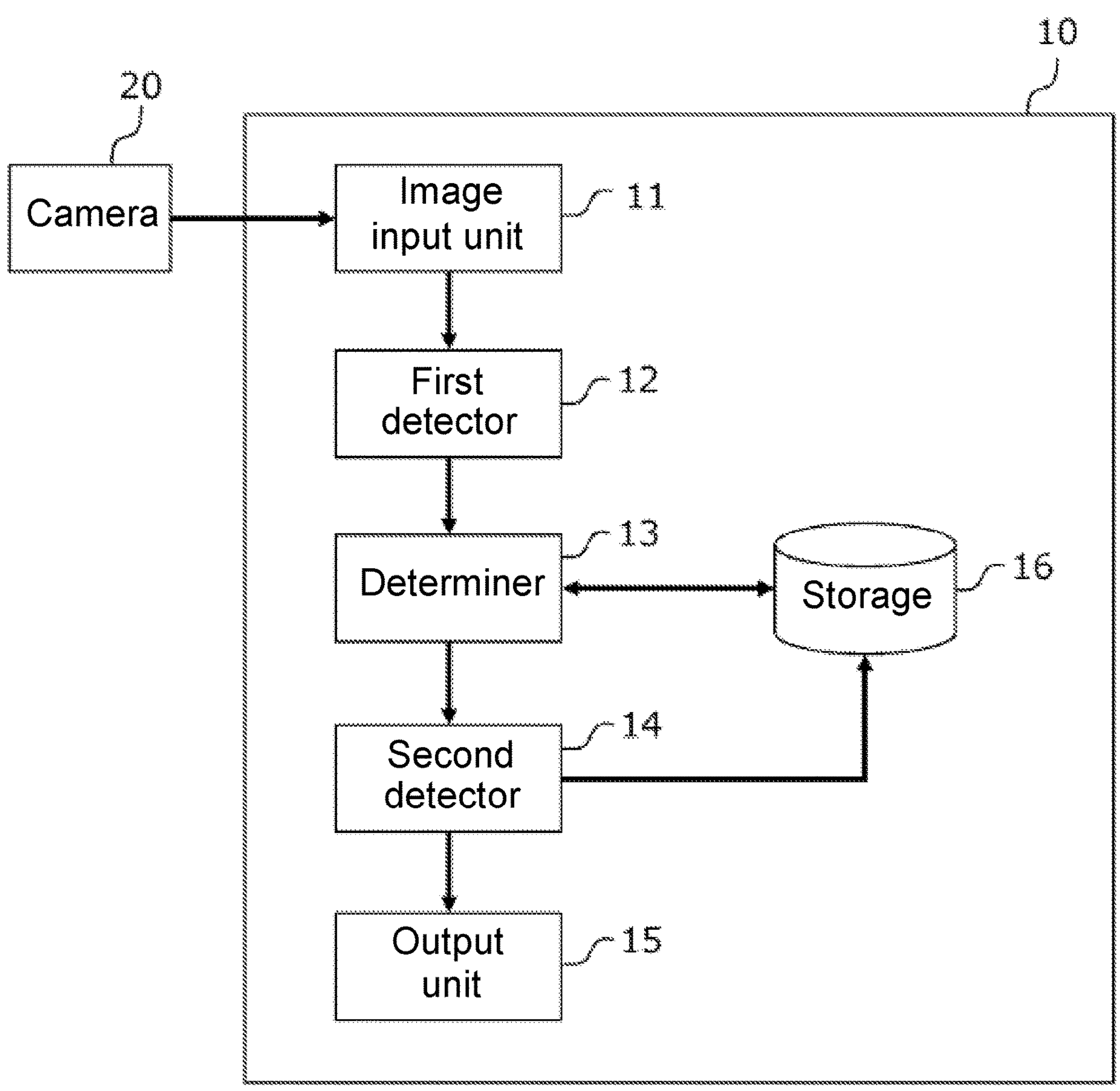
FIG. 2 is a diagram showing the structure of an object detection device.

FIG. 2 is a functional block diagram of an object detection device 10 according to the present embodiment. The object detection device 10 is an information processing unit (computer) including, for example, an arithmetic unit (a central processing unit or a CPU, or a processor), a memory, a storage unit (storage 16), and an input-output unit. The object detection device 10 executes a program stored in the storage unit to implement the functions of an image input unit 11, a first detector 12, a determiner 13, a second detector 14, an output unit 15, and other units. These functions may be partially or entirely implemented using dedicated logic circuits, such as an application-specific integrated circuit (ASIC) and a field-programmable gate array (FPGA).

The image input unit 11 receives image data from a camera 20. The captured image data is transmitted to the first detector 12. The image data may be stored into the storage 16. Although image data is directly received from the camera 20 in the present embodiment, image data may be received through an apparatus such as a communication apparatus or through a recording medium. Any images may be input, including RGB images, grayscale images, or images representing, for example, distance or temperature.

The first detector 12 detects candidate areas (areas in which detection target objects are likely to be included) from an input image. In the present embodiment, the first detector 12 includes detectors that use a Haar-like feature amount and AdaBoost for candidate area detection. The detection result is transmitted to the determiner 13. The detection result includes detected candidate areas and may also include the likelihood (a first detection confidence level or a detection score) of detection target objects included in the candidate areas. Such detection may be performed with any feature amounts and with detectors using any learning algorithm. For example, feature amounts may include a histogram of gradient (HoG), a scale-invariant feature transform (SIFT), a speeded-up robust features (SURF), and a sparse feature amount. Learning algorithms may include boosting other than AdaBoost, a support vector machine (SVM), a neural network, and decision tree learning.

The determiner 13 determines areas (target areas) to which the second detector 14 performs detection from the candidate areas detected by the first detector 12. In the present embodiment, the determiner 13 uses detection information for the previous frame stored in the storage 16 to determine target areas from the candidate areas. The detection information includes information about the target areas (erroneous detection area described later) in which the second detector 14 has detected no object in a frame that is at least one frame preceding the current frame. The determiner 13 excludes the candidate areas with a similarity greater than or equal to a predetermined value to the erroneous detection area and determines the remaining areas as target areas. The determiner 13 then outputs the determination result to the subsequent second detector 14. When the detection result obtained by the first detector 12 includes the above first detection confidence level, the determiner 13 may exclude the candidate areas similar to the erroneous detection area from the candidate areas with the first detection confidence level greater than or equal to the predetermined value and determines the remaining areas as target areas.

The second detector 14 performs object detection for the target areas determined by the determiner 13. The detection result includes information indicating whether detection target objects are included in the target areas and may also include, for example, the likelihood (a second detection confidence level or a detection score) of detection target objects included in the target areas. In the present embodiment, after object detection, the second detector 14 records both or either the position or the size of the target area that has been determined to include no detection target object into the storage 16 as detection information. In some embodiments, the second detector 14 may record the detection information (both or either the position or the size) about all the target areas determined by the determiner 13 into the storage 16. In the present embodiment, the second detector 14 includes detectors that use deep learning for object detection. The detectors may use any known deep learning techniques such as a convolutional neural network (CNN), a recurrent neural network (RNN), a stacked auto encoder (SAE), and a deep belief network (DBN). The second detector 14 may not be a detector that uses deep learning. The detection algorithm with the second detector 14 may allow more accurate detection with a larger amount of computation than the detection algorithm with the first detector 12.

The output unit 15 outputs a detection result about an object detected by the second detector 14. For example, the output unit 15 outputs result information indicating that an object has been detected in the candidate area with the confidence level of the detection result by the second detector 14 greater than or equal to a threshold. The result information may exclude the information about the candidate areas with the confidence level less than the threshold. Any information may be used as detection result information. Examples of the detection result information for face detection include information about a face area, a confidence level, a face orientation, an age, a gender, a human race, and facial expression.

<Process>

Figure 3:
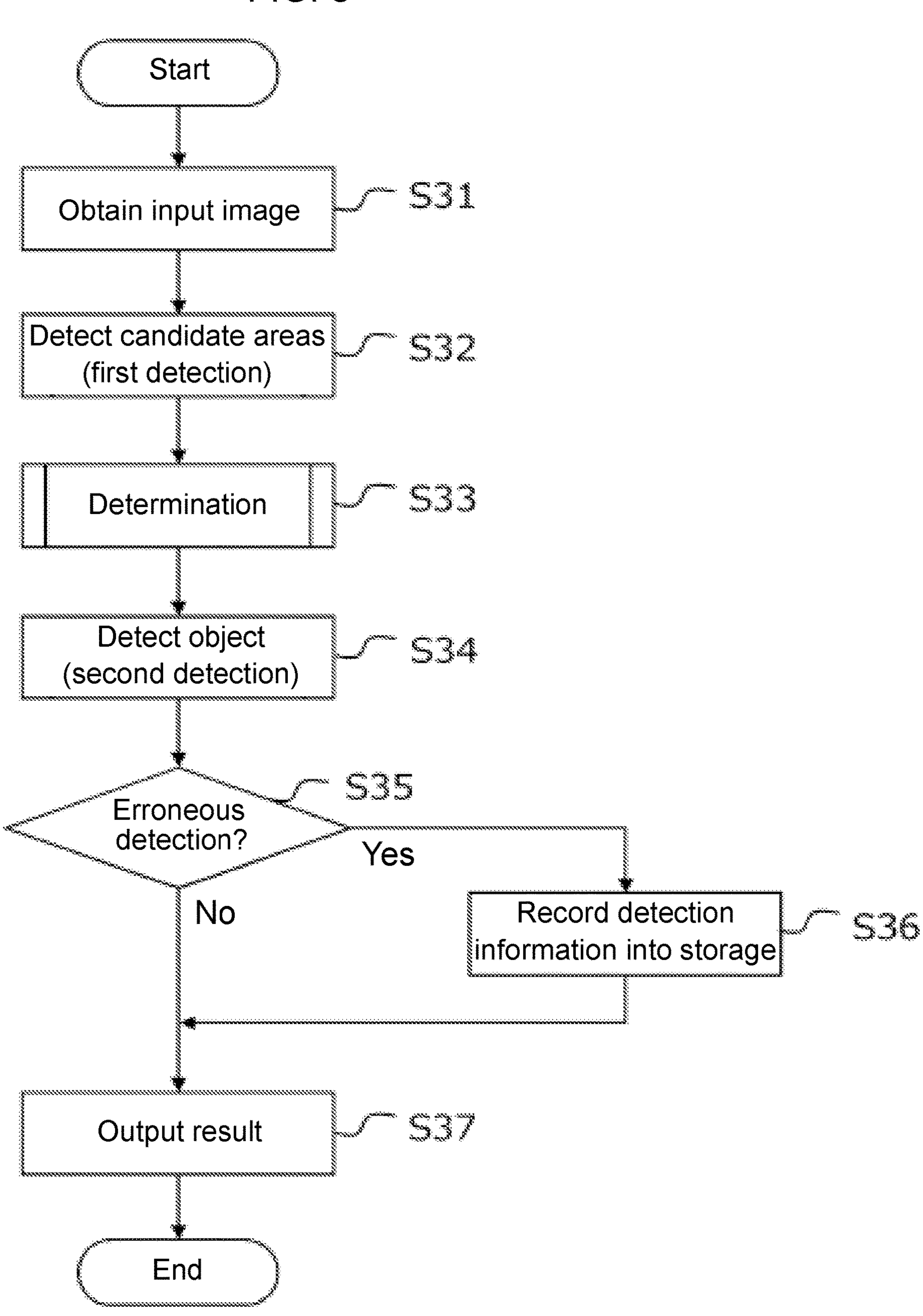
FIG. 3 is a flowchart of object detection.

FIG. 3 is a flowchart of the overall process of object detection performed by the object detection device 10. The object detection device 10 will now be described in detail in accordance with the flowchart in FIG. 3.

<<S31: Image Input>>

In step S31, the object detection device 10 obtains an image (input image). The input image may be obtained from the camera 20 through the image input unit 11, from another computer through a communication unit 104, or from the storage 16.

<<S32: First Detection>>

In step S32, the first detector 12 detects candidate areas (areas in which a detection target object is expected to be included) from the input image (first detection). In the present embodiment, the first detector 12 uses the Haar-like feature amount as an image feature amount and AdaBoost as a learning algorithm. The detection result in the first detection may include the likelihood (a first detection confidence level or a detection score) of detection target objects included in the candidate areas, as well as the above candidate areas.

<<S33: Determination>>

In step S33, the determiner 13 excludes the candidate areas detected in step S32 with a similarity greater than or equal to a predetermined value to an erroneous detection area and determines the remaining candidate areas as target areas. The erroneous detection area is an area in which no object has been detected in second detection in a frame that is at least one frame preceding the current frame. The second detection will be described later. The determiner 13 excludes the candidate areas detected in step S32 similar to the erroneous detection area and outputs the remaining candidate areas as target areas.

Figure 4:
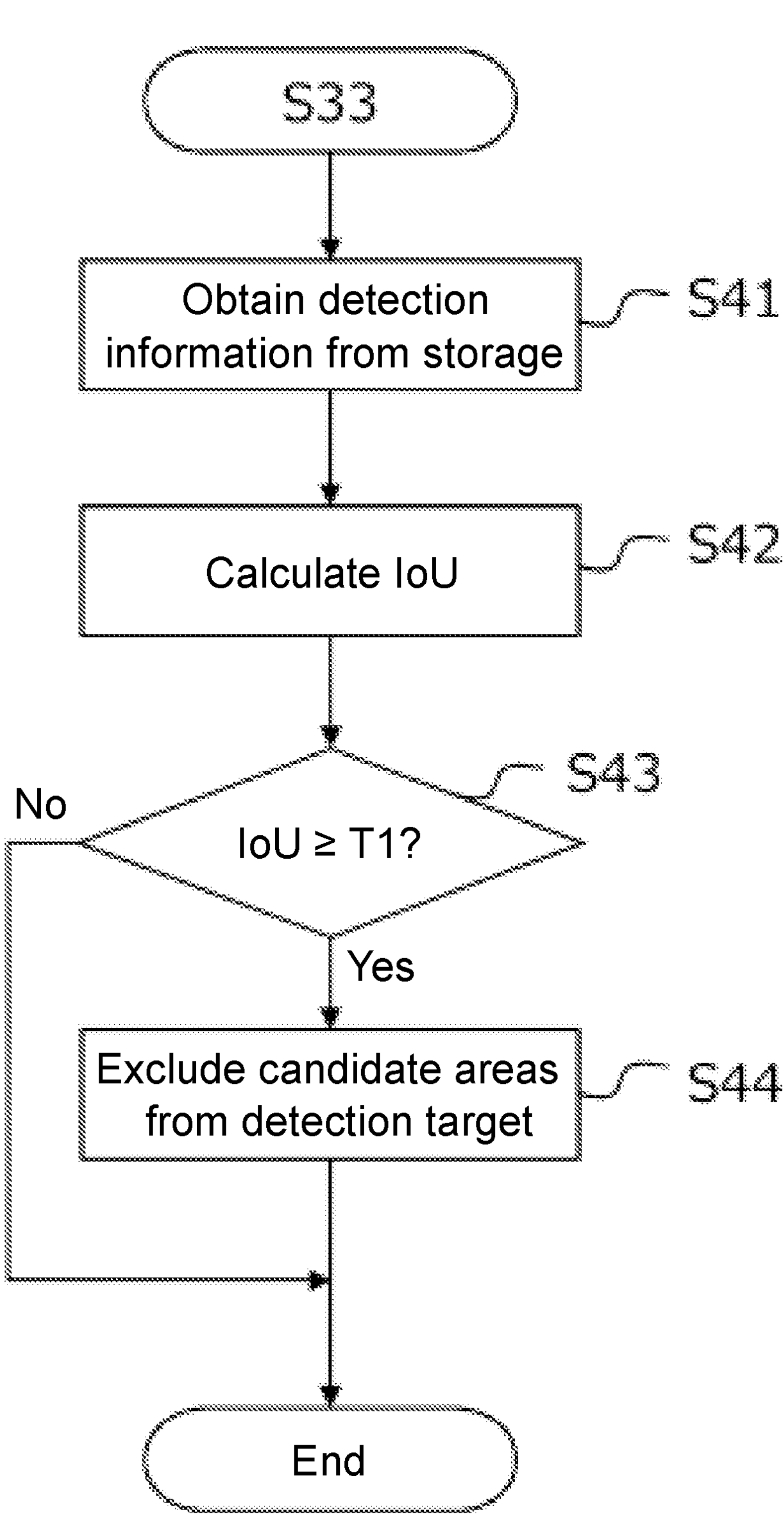
FIG. 4 is a flowchart of determination.

The determination performed in step S33 will now be described in detail with reference to FIG. 4. FIG. 4 is a flowchart showing the determination in the present embodiment. The determiner 13 first obtains detection information (the position and the size of an erroneous detection area) from the storage 16 (S41). The determiner 13 may obtain erroneous detection information about an immediately-preceding frame alone or several preceding frames. The determiner 13 then calculates a similarity to the erroneous detection area for each of one or more candidate areas (S42). In the present embodiment, Intersection over Union (IoU) is used as an index for a similarity between the areas. IoU is a value calculated by dividing an area of intersection of two areas by the area of union of the two areas. IoU may be any value between 0 and 1. IoU is 1 for two areas that overlap completely and 0 for two areas that do not overlap at all. The positions and the sizes of a candidate area and an erroneous detection area may be used to calculate IoU. The determiner 13 determines whether IoU is greater than or equal to a predetermined threshold T1 (S43). The determiner 13 then excludes the candidate areas with IoU greater than or equal to the predetermined threshold T1 and outputs the remaining areas as target areas (S44).

<<S34 to S36: Second Detection>>

In step S34, the second detector 14 determines whether a detection target object is included in one or more target areas output in step S33 (second detection). In the present embodiment, the second detector 14 uses discriminators that have learned through a multilayer neural network, which is called the CNN, for object detection.

In step S35, the second detector 14 determines whether any of the target areas has been determined to include no detection target object in step S34.

In step S36, the second detector 14 records information about the target area that has been determined to include no detection target object into the storage 16 as detection information. In the present embodiment, the position and the size of the target area that has been determined to include no detection target object is recorded into the storage 16 as the detection information.

<<S37: Detection Result Output>>

In step S37, the output unit 15 outputs a detection result about the area in which an object has been detected in step S34. The output unit 15 outputs result information indicating that a detection target object has been detected in a detection target area with the confidence level (second detection confidence level) of the detection result by the second detector 14 greater than or equal to a threshold. The result information may exclude the information about the detection target areas with the confidence level less than the threshold.

Advantageous Effects of First Embodiment

An object in an input image may be erroneously detected repeatedly. However, the structure according to the present embodiment may effectively reduce erroneous detection of an object at the same position and with the same size. This reduces the number of candidate areas (target areas) to be used by the second detector. The two-stage detection process may thus be performed to reduce the processing time without lowering the detection accuracy.

Second Embodiment

In the first embodiment described above, the similarity is determined in step S33 based on the positions and the sizes of the candidate areas and the erroneous detection areas. In the present embodiment, the similarity is determined in step S33 by pattern matching between an image corresponding to a candidate area and an image corresponding to an erroneous detection area. The processing that is the same as in the first embodiment described above will not be described, and determination (S33) different from the processing described in the first embodiment will be described.

<Determination (S33)>

Figure 5:
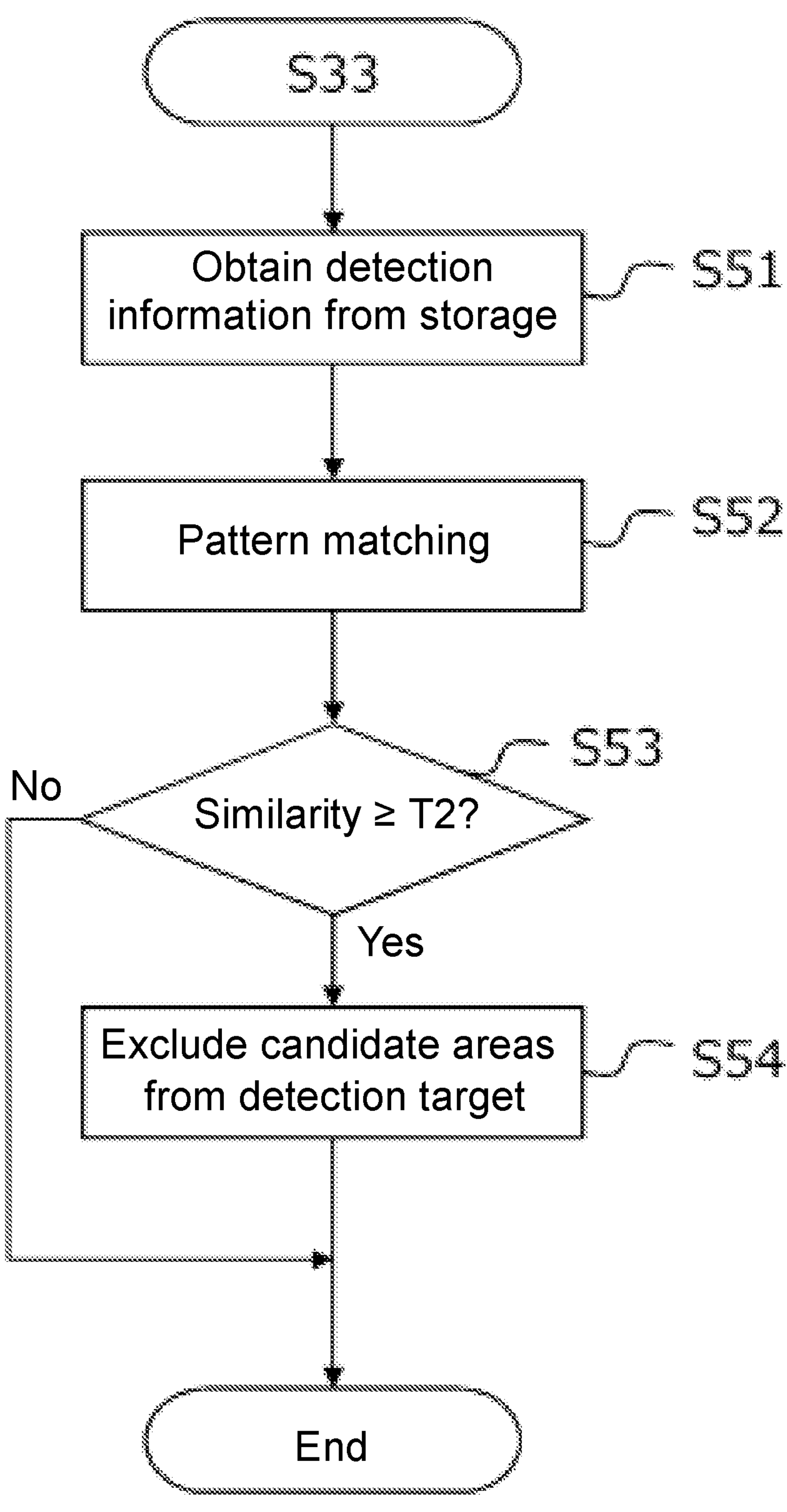
FIG. 5 is a flowchart of determination.

FIG. 5 is a flowchart of determination in step S33 in the present embodiment. The determiner 13 first obtains detection information from the storage 16 (S51). In the present embodiment, the detection information includes an image corresponding to an erroneous detection area. The determiner 13 performs pattern matching on each image corresponding to one or more candidate areas using an image corresponding to an erroneous detection area (S52). The determiner 13 determines whether the similarity between the images obtained by the pattern matching is greater than or equal to a threshold T2 (S53), and then excludes the candidate areas with the similarity greater than or equal to the predetermined threshold T2 and outputs the remaining areas as target areas (S54).

Advantageous Effects of Second Embodiment

For an erroneous detection area and a candidate area identical or similar to each other in the position and size, this structure can perform object detection with high accuracy when images corresponding to the two areas largely differ from each other. For example, when a detection target object overlaps the object 103 shown in FIG. 1, the similarity is calculated based on images, and thus an area corresponding to the position of the detection target object may be successfully detected as a target area.

(Modifications)

Although the determiner 13 excludes the candidate areas similar to the erroneous detection area from the candidate areas and determines the remaining areas as target areas in the first and second embodiments described above, the determiner 13 may determine a target area with any other method. For example, when the first detector 12 outputs the first detection confidence level described above, the determiner 13 determines a candidate area with the first detection confidence level greater than or equal to a predetermined threshold T3 as a target area. The determiner 13 may determine a candidate area, as a target area, with a similarity greater than or equal to a predetermined threshold T4 to an erroneous detection area when such a candidate area has a value obtained by subtracting a predetermined value from the first detection confidence level greater than or equal to the predetermined threshold T3.

The predetermined value to be subtracted from the first detection confidence level may be determined with any method. A value subtracted from the confidence level may be fixed. In some embodiments, the predetermined value subtracted from the confidence level may be determined based on the number of consecutive frames in which the second detector 14 has detected no target object. For example, the predetermined value may be greater as the number of consecutive frames increases, or the predetermined value may be subtracted from the first detection confidence level for the first time when the number of consecutive frames reaches a predetermined value. Further, when the second detector 14 outputs the second detection confidence level, the predetermined value subtracted from the confidence level may be determined based on the second detection confidence level. For example, the determiner 13 determines a candidate area with the first confidence level greater than or equal to the threshold T3 as a target area. The determiner 13 may determine a candidate area, as a target area, with a similarity greater than or equal to the predetermined threshold T4 to an erroneous detection area when such a candidate area has a value obtained by subtracting a value based on the second detection confidence level from the first detection confidence level greater than or equal to the predetermined threshold T3. For example, the predetermined value subtracted from the confidence may be greater as the second detection confidence increases.

Although IoU is used as an index of a similarity between areas in the first embodiment described above, any other indexes may be used. Such indexes of a similarity include the ratio or difference between the sizes of areas, the difference between the positions of areas (e.g., the coordinates of the centers), or any combination of these.

Although pattern matching is used to determine a similarity between images in the second embodiment described above, any other techniques may be used. For example, differences in color information or in luminance information in images may be used as an index of a similarity.

REFERENCE SIGNS LIST

10: object detection device
11: image input unit
12: first detector
13: determiner
14: second detector
15: output unit
16: storage
1, 20: camera
101, 102, 103: object
111, 112, 113: candidate area
121, 122, 123: target area

The invention claimed is:

1. An object detection device for detecting a predetermined object from an image, the object detection device comprising:

a first detector configured to detect one or more candidate areas including the predetermined object from the image and output a first detection confidence level indicating a likelihood of the predetermined object included in the one or more candidate areas;

a determiner configured to determine a target area from the one or more candidate areas detected by the first detector;

a second detector configured to detect the predetermined object in the target area with a detection algorithm different from a detection algorithm used by the first detector; and a storage configured to store detection information indicating a detection result obtained by the second detector for the target area, wherein the detection information includes information about a target area in which the predetermined object is undetected by the second detector, and the determiner determines the target area from one or more candidate areas of the one or more candidate areas with a similarity greater than or equal to a predetermined value to a target area in which the predetermined object is undetected in a previous frame based on a value obtained by subtracting a predetermined value from the first detection confidence level, and determines the target area from one or more other candidate areas of the one or more candidate areas based on the first detection confidence level.

2. The object detection device according to claim 1, wherein the determiner excludes a candidate area of the one or more candidate areas with a similarity greater than or equal to a predetermined value to a target area in which the predetermined object is undetected in a previous frame, and determines one or more other candidate areas of the one or more candidate areas as the target area.

3. The object detection device according to claim 1, wherein the predetermined value is determined based on a number of consecutive frames in which the predetermined object is undetected by the second detector.

4. The object detection device according to claim 1, wherein the predetermined value is fixed.

5. The object detection device according to claim 1, wherein the detection information includes a second detection confidence level determined by the second detector and indicating a likelihood of the predetermined object included in the one or more candidate areas, and the determiner determines the target area from one or more candidate areas of the one or more candidate areas with a similarity to a target area indicated by the detection information greater than or equal to a predetermined value based on a value obtained by subtracting a value corresponding to the second detection confidence level from the first detection confidence level, and determines the target area from one or more other candidate areas of the one or more candidate areas based on the first detection confidence level.

6. The object detection device according to claim 2, wherein the detection information includes at least one of a position or a size of the target area, and the determiner calculates the similarity based on at least one of a position or a size of each of the one or more candidate areas and the at least one of the position or the size of the target area.

7. The object detection device according to claim 2, wherein the detection information includes an image corresponding to the target area, and the determiner calculates the similarity based on the image included in the detection information and images corresponding to the one or more candidate areas.

8. An object detection method for detecting a predetermined object from an image, the method comprising:

detecting one or more candidate areas including the predetermined object from the image;

outputting a first detection confidence level indicating a likelihood of the predetermined object included in the one or more candidate areas;

determining a target area from the detected one or more candidate areas;

detecting the predetermined object in the target area with a detection algorithm different from an algorithm used in detecting the one or more candidate areas; and storing detection information indicating a detection result in detecting the predetermined object in the target area, wherein the detection information includes information about a target area in which the predetermined object is undetected, and determining the target area includes determining the target area from one or more candidate areas of the one or more candidate areas with a similarity greater than or equal to a predetermined value to a target area in which the predetermined object is undetected in a previous frame based on a value obtained by subtracting a predetermined value from the first detection confidence level, and determining the target area from one or more other candidate areas of the one or more candidate areas based on the first detection confidence level.

9. A non-transitory computer readable medium storing a program for causing a computer to perform a process for detecting a predetermined object from an image, the process comprising:

detecting one or more candidate areas including the predetermined object from the image;

outputting a first detection confidence level indicating a likelihood of the predetermined object included in the one or more candidate areas;

determining a target area from the detected one or more candidate areas;

detecting the predetermined object in the target area with a detection algorithm different from an algorithm used in detecting the one or more candidate areas; and storing detection information indicating a detection result in detecting the predetermined object in the target area, wherein the detection information includes information about a target area in which the predetermined object is undetected, and determining the target area includes determining the target area from one or more candidate areas of the one or more candidate areas with a similarity greater than or equal to a predetermined value to a target area in which the predetermined object is undetected in a previous frame based on a value obtained by subtracting a predetermined value from the first detection confidence level, and determining the target area from one or more other candidate areas of the one or more candidate areas based on the first detection confidence level.

* * * * *